UNITED STATES PATENT OFFICE.

ANTON OTHMAR SIMONNIER, OF VIENNA, AUSTRIA-HUNGARY, ASSIGNOR OF ELEVEN-TWENTIETHS TO EMIL FRISCHAUER, OF SAME PLACE.

COMPOSITION FOR CARBONS FOR ELECTRIC LAMPS.

SPECIFICATION forming part of Letters Patent No. 624,552, dated May 9, 1899.

Application filed February 15, 1899. Serial No. 705,577. (No specimens.)

*To all whom it may concern:*

Be it known that I, ANTON OTHMAR SIMONNIER, a subject of the Emperor of Austria-Hungary, residing at Vienna, in the Province of Lower Austria and Empire of Austria-Hungary, have invented a new and useful Composition for Carbons for Electric-Arc Lamps, of which the following is a specification.

My invention relates to the carbon pencils between which Davy's arc is formed in electric-arc lamps; and it has for its object to provide a composition of matter enabling the pencils made of it to burn away more slowly than the known ones.

According to the invention finely-ground carbon—*i. e.*, wood-charcoal or carbon from gas-retorts, or a mixture of both—is mixed with finely-ground quartz and diamond-dust. The mixture is made up into a dough by incorporating it with a solution of copper salt and with jellied silicic acid. Of the doughy mass the pencils are molded in the ordinary way and afterward burned, as usual.

The copper salt by preference used is copper sulfate, and the proportions of the ingredients I prefer are the following ones: carbon, about eighty-three parts, by weight; quartz, about seven parts, by weight; diamond-dust, about ten parts, by weight. Per kilogram of the thoroughly-mingled powder I add about one-eighth of a liter of a concentrated aqueous solution of copper sulfate and one-eighth of a liter of jellied silicic acid.

What I claim, and desire to secure by Letters Patent of the United States, is—

1. The herein-described composition for carbons for electric-arc lamps, consisting of ground carbon, ground quartz, diamond-dust, an aqueous solution of a soluble copper salt, and jellied silicic acid, substantially as described and for the purpose specified.

2. The herein-described composition for carbons for electric-arc lamps, consisting of ground carbon, ground quartz, diamond-dust, an aqueous solution of copper sulfate, and jellied silicic acid, substantially as and for the purpose set forth.

In witness whereof I have signed this specification in presence of two witnesses.

ANTON OTHMAR SIMONNIER.

Witnesses:
ALVESTO S. HOGUE,
AUGUST FUGGER.